United States Patent

Heinrich

[11] 4,022,691
[45] May 10, 1977

[54] MIXING CHAMBER FOR THICKENING SEWAGE SLUDGE BY MEANS OF A FLOCCULATION AGENT COMBINED WITH OVERFLOW DRAINAGE MEANS

[76] Inventor: Hans Jurgen Heinrich, Wilhelmshoherstr. 129, 5828 Ennepetal, Germany

[22] Filed: Apr. 6, 1976

[21] Appl. No.: 674,233

[30] Foreign Application Priority Data

Dec. 18, 1975 Germany .......................... 2556995

[52] U.S. Cl. .............................. 210/202; 210/203; 210/205; 210/400
[51] Int. Cl.² ........................................ B01D 33/14
[58] Field of Search ..................... 210/10, 200–204, 210/206, 216, 217, 386, 400, 401, 205; 241/46.11, 46.17; 259/8, 43, 44

[56] References Cited

UNITED STATES PATENTS

| | | | |
|---|---|---|---|
| 3,230,282 | 1/1966 | Campagne et al. ................. | 259/8 X |
| 3,285,712 | 11/1966 | Matasa et al. .............. | 261/DIG. 75 |
| 3,531,404 | 9/1970 | Goodman et al. ............... | 210/10 X |
| 3,896,030 | 7/1975 | Bahr ............................. | 210/386 X |
| 3,957,210 | 5/1976 | Durr ........................... | 241/46.11 X |
| 3,959,126 | 5/1976 | Millward .............................. | 210/10 |

Primary Examiner—Frank A. Spear, Jr.
Assistant Examiner—Robert H. Spitzer

[57] ABSTRACT

A mixing chamber for thickening sludge, especially sludges in a sewage clarification plant by means of a flocculation agent in combination with an overflow drainage means wherein the sewage feed to the bottom of the mixing chamber enters a mixing zone and flows upwardly into an overflow at the top and out through a diversion means for the thickened sludge leading to a sedimentation belt or to a press filter, handling to the outside of the mixing chamber. The top of the mixing zone is widened by means of a flow section for the thickened sludge which is formed by dewatering through the perforated screen walls and the waste water is disposed downstream of the agitated mixing zone.

The sludge flows in an upward direction through the agitated mixing zone inside a common housing formed by the walls of the mixing zone and the flow section formed by the perforated screen walls in the dewatering section at the top while a spill zone is disposed directly above the dewatering section to permit the outflow of thickened sludge to the drainage station.

5 Claims, 4 Drawing Figures

MIXING CHAMBER FOR THICKENING SEWAGE SLUDGE BY MEANS OF A FLOCCULATION AGENT COMBINED WITH OVERFLOW DRAINAGE MEANS

CROSS REFERENCE TO RELATED APPLICATION

Applicant refers to a West German Pat. application No. P 25 56 995.3 filed on Dec. 18, 1975 under which Priority under 35 USC 119 is claimed.

BACKGROUND OF THE INVENTION a. Field of the Invention

The invention relates to a mixing chamber for thickening of a sludge, especially of sludges in sewage clarification plants by means of a flocculation agent, (combined with overflow drainage means, whereby the mixing chamber has a mixing zone and a diversion for the thickened sludge leading to a sedimentation arrangement and/or a press filter.

b. Description of the Prior Art

In the case of dehydration, drainage and purification of sludges, especially in the case of purification of sewage sludge, flocculation agents are added to the sludge in order to separate non-settable suspended solids and colloidally dissolved substances under stirring forces within a mixing chamber. Since the suspended substances and colloidal particles in an aqueous environment have an equal electric charge on their surface, they themselves cannot coagulate into larger particles capable of easily sedimentation. In the case of the addition of flocculation agents which have a charge character opposite to the charge of the particles that are to be eliminated, the solid particles agglomerate with the flocculation agents while forming large flakes which are capable of easy sedimentation. The flocculation agents consist of natural or synthetic long, branched chain molecules, and especially synthetic molecules in the form of polymerizates used as the basis of the coagulating agent; namely, polyacrylamide, polyacrylate, polyethylene, imines and polyethyloxides have been most widely used.

In the case of the known sewage clarification plants, after the addition of flocculation agent, the thickened sludge is fed to the upper end of a revolving belt screen of the straining zone, on which the flakes formed settle, while a large part of the water seeps through the screen belt consisting generally of a cloth and drops off. Generally, the water content of the sludge is reduced at the end of the stretch of the straining zone by about 60% so that then an aqueous sludge exists which can be subjected to a filtration process within a screen belt press.

In practice, it turns out that the thickened sludge must remain for a relatively long time in the straining zone in order to actually reach the degree of dehydration and drainage possible on such a screen belt of the straining zone. Because the first settled flakes will already occupy the holes of the screen belt or cloth whereupon the water from higher sludge and slime layers can seep through now only very slowly and drop off. For that reason, the screen belt for the straining zone must be made either very long or it must be allowed to run very slowly, which however leads to considerable installation and processing costs in both cases.

SUMMARY OF THE INVENTION

The invention is based on the task for creating an apparatus combining, mixing and draining means with which thickened sludges can be dehydrated in an accelerated manner by the addition of a flocculation agent.

The invention starts out with a mixing chamber of the initially mentioned type and is characterized by a flow section formed by perforated screening walls disposed downstream of the mixing zone. The holes of the screening walls in this case are dimensioned somewhat smaller than the size of the flakes formed in the sludge. Generally, diameters of about 0.4 mm diameter are suitable for the holes. On the way from the mixing zone to the settling or straining zone, the thickened sludge in the area of the perforated screen walls experiences a quick and very considerable predehydration, as a result of which the tarry time of the thickened sludge, which is still required in the sedimentation or straining zone, is shortened considerably. The invention rests on the observation that the sludge leaving the mixing zone has a clear phase separation between water and flakes of solid substance hovering therein, whereby the flakes hover in the sludge so to speak in a loosened up manner. In this stage water can be withdrawn right through the perforated screening walls relatively quickly and in a large quantity, whereby through the flow of the sludge the flakes will be prevented from settling in front of the holes of the screen walls, since they are continuously carried along by the stream of the sludge.

The invention is realized in a particularly effective manner in the case of mixing chambers with a mixing zone through which the sludge flows in an upward direction, by disposing the mixing zone, the flow section formed by perforated screening walls and a spill zone immediately one on top of the other inside a common housing. Within the aqueous phase, the flakes are in a whirled up (stirred up), loose state precisely in such a flow section through which the sludge flows likewise in an upward direction and located immediately above the mixing zone.

According to an alternative embodiment, the flow section formed by perforated screening walls can also be provided outside of the housing of the mixing chamber. Thus, in the case of mixing chambers which have a diversion for the thickened sludge disposed outside of the housing of the mixing chamber and leading upwards from the upper end of the housing of the mixing chamber, provision can be made that the diversion on its underside at least has a wall in the manner of a punctured sieve, whereby the diversion can be developed effectively as a groovelike arc sieve. On the bottom of the diversion or groove, displaced vortex metal sheets can be provided through which the stream of sludge is relayered and whirled through. In this case too, the flakes are carried along by the flow of sludge away from the holes of the sieve, so that said holes remain open for a passage of the water.

According to a preferred embodiment of the invention, always one flow section formed by perforated screening walls has been disposed both inside as well as outside of the housing of the mixing chamber for the rough dehydration of the thickened sludge.

BRIEF DESCRIPTION OF THE DRAWINGS

The invention will be described in more detail in the following paragraphs on the basis of several embodiments in the drawing.

DESCRIPTION OF THE PREFERRED EMBODIMENT

Figure 1:
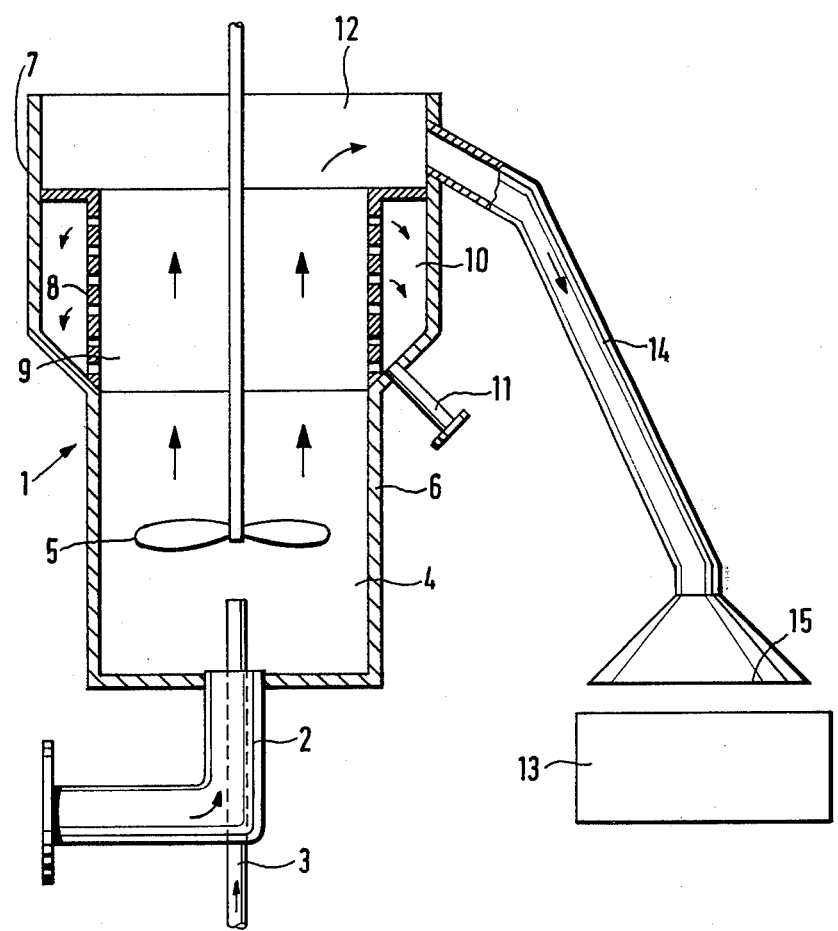
FIG. 1 shows in a vertical section a first embodiment with a dehydration flow section disposed inside of the mixing chamber.

FIG. 1 shows an essentially cylindrical mixing chamber 1 fitted with stirring means, the chamber comprising a housing 6 and a bottom part into which the sludge that is to be purified is introduced from below the bottom through a pipe 2 into mixing zone 4. The flocculation agent is introduced into the mixing zone 4 of the mixing chamber through a smaller diameter pipe 3 penetrating, e.g., passing within, the intake of the pipe 2, and the flocculating agent enters chamber below the stirring means, agitator 5 which rotates to keep the sludge in suspension. The housing 6 of the mixing chamber above the mixing zone 4 is provided with a truncated section 7 enlarged in diameter and in which a foraminated flow section 9 is formed by means of a cylindrical, perforated screen wall 8 of the same diameter as mixing zone 4 is disposed for separating water from the thickened sludge in the mixing zone 4. The perforate screen wall 8 is aligned in the direction of flow with the wall 6 of the housing in the mixing zone 4 and is rigidly attached to said wall. The perforated screen wall 8 is enclosed on the outside by the truncated enlarged portion 7 of the housing of the mixing chamber, while forming a collecting chamber 10 for the water and the collected water in chamber 7 is removed with a drain 11.

Above the flow section 9, an overflow or spill zone 12 is provided with which is connected a diversion 14 with a broadened slit-shaped exit opening 15 to remove the overflow outside of the pipe chamber 1. The material flowing out then lead to a screen belt 13 of the straining zone.

The sludge which is thickened by adding coagulating agent and mixing in the mixing zone 4 experiences a strong preliminary dehydration and drainages in the flow section 9 in a short period of time so that the time-critical dehydration is correspondingly relieved through the upward flow of thickened sludge, deviating in chamber to and sedimentation on the screen belt 13. These steps of upward flow, overflow, diversion through pipe 14 of the straining zone, constitute the straining operations above the mixing zone.

Figure 2:
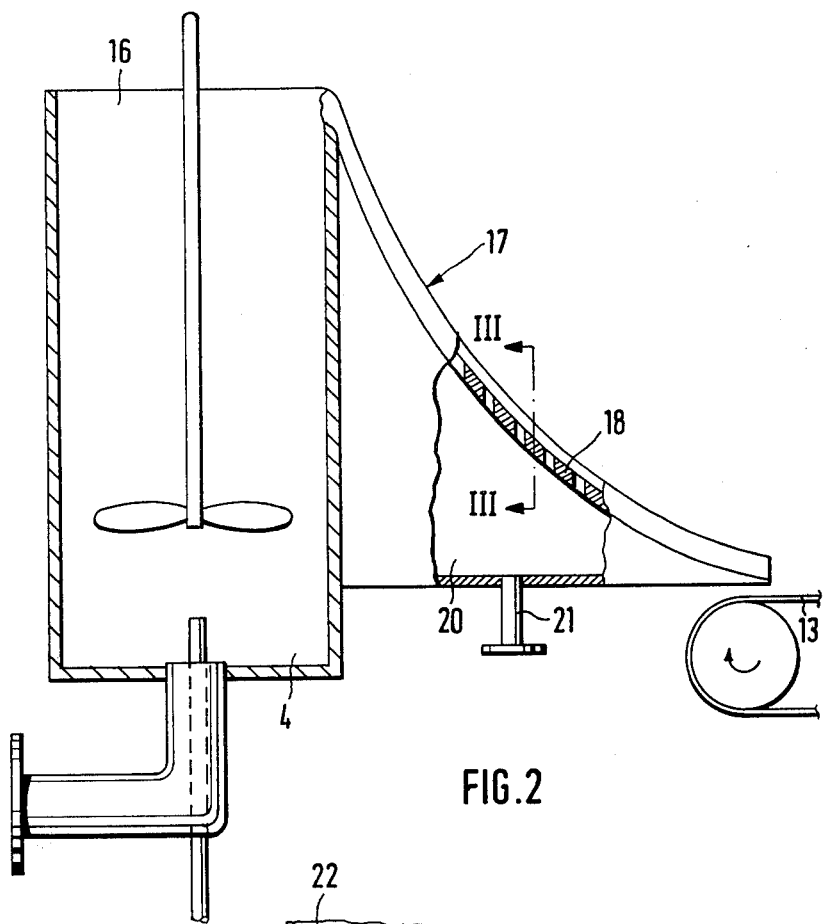
FIG. 2 is an embodiment with a dehydration flow section disposed outside of the mixing chamber.

In the case of the embodiment according to FIG. 2, a spill zone 16 has been provided immediately above the mixing zone 4 of the mixing chamber, with which a downward directed diversion 17 leading to the revolving screen belt 13 of the straining zone has been connected. The diversion consists of a groovelike arc sieve with a perforated groove bottom 18 and two lateral enclosing walls 19. Below the arc sieve is a collecting chamber 20 for the water with a drain 21. On the perforated bottom 18 of the groovelike diversion formed by drain 17, vortex metal sheets 22 are displaced in relation to one another and slanting inward by and are attached in the direction of flow, so that the sludge is guided on a zig-zag path through the metal sheets and is circulated and continuously put into a thorough turbulent motion. The thickened sludge undergoes a strong preliminary dehydration in the diversion 17 prior to reaching the upper end of the screen belt 13 of the straining zone, as shown in FIG. 3.

Figure 3:
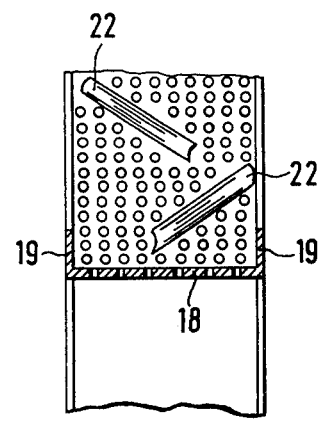
FIG. 3 is a cut following line III—III in FIG. 2.
Figure 4:
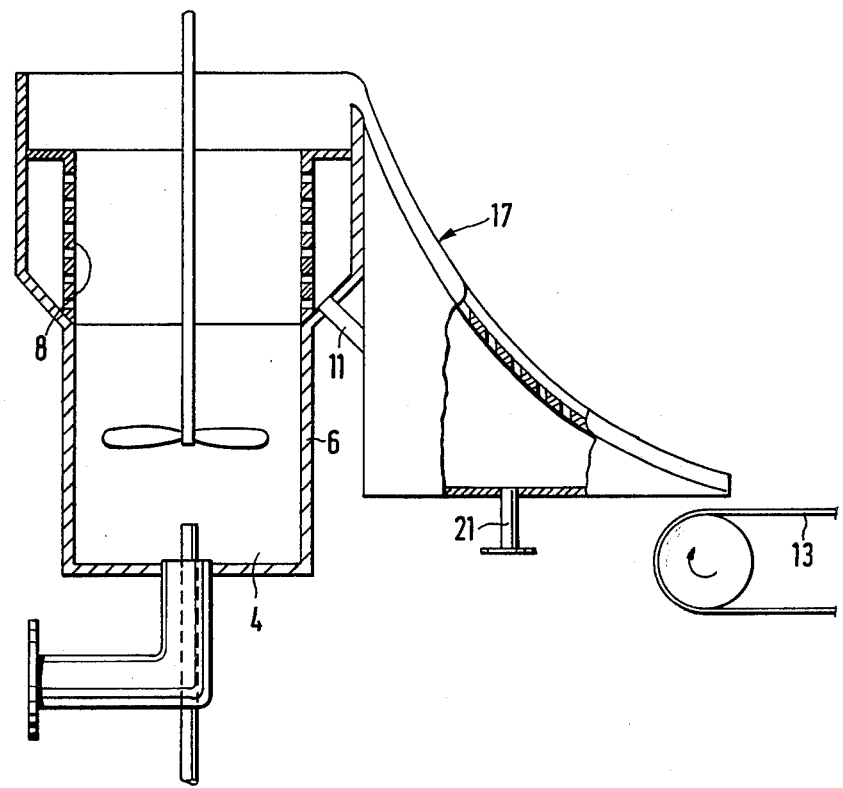
FIG. 4 is a third embodiment.

FIG. 4 shows a preferred embodiment in the case of which the mixing chamber is provided both with a flow section according to FIG. 1 formed by perforated screen walls 8 and disposed inside of its housing, as well as with a screen hole flow section according to FIGS. 2 and 3, disposed outside of the housing of the mixing chamber, whereby the drain 11 of the collecting chamber 10 for the water according to FIG. 1 empties directly into the collecting chamber 20 for the water according to FIG. 2.

What I claim is:

1. A mixing chamber for thickening sludge, especially sludge in a sewage clarification plant by means of agitation and addition of a flocculating agent, in combination with a drainage system to move the sludge out of the mixing chamber, comprising a generally cylindrical housing having a cup-like bottom portion and a widened upper portion;

agitating means in said housing defining a mixing zone at the lower portion thereof;

an inlet means for raw sewage connected to said bottom portion defining a feeding zone;

an inlet pipe within and penetrating into said inlet means of smaller diameter than said inlet means which is adapted to add a flocculating agent to the sludge to thereby cause thickening of said sludge in said mixing zone;

the widened upper portion of said housing comprising a perforated inner wall coextensive with the bottom portion of said housing and an outer wall spaced from said inner wall defining an annular chamber;

a separate outlet for said annular chamber;

said perforated inner wall constituting means for dewatering the thickened sludge in said housing about said annular chamber in a zone directly above the feeding zone and the mixing zone;

a dewatering means including pipe means extending from the upper portion of said housing outside of said housing to a drainage system and an outlet on said pipe means to deliver thickened sludge from said mixing chamber to said draining system; and a further drainage means of said drainage system outside of said mixing chamber for further dewatering of said sludge adapted for subsequent storage or conveying of said sludge.

2. The combination as claimed in claim 1 wherein said further drainage means outside said mixing chamber is a filter press.

3. The combination as claimed in claim 1 wherein said further drainage means outside said mixing chamber is a sedimentation screen belt.

4. The combination claimed in claim 1 wherein said drainage system further comprises a dewatering means fitted with an elongated arcuate foraminated passageway extending downwardly from the upper part of said housing outside of said housing, a dewatering and draining zone therebelow, a lower sieve surface for said passageway and an outlet for said passageway adapted to deliver the thickened sludge to a conveyor or storage;

said dewatering means outside of said mixing chamber including a collecting chamber for collecting water passing through said arcuate elongated passageway; and, said dewatering means further including an outlet for the collected water at the bottom of said collecting chamber.

5. The combination claimed in claim 4 wherein said foraminated passageway in said dewatering means is formed of vortex metal sheets angularly disposed with respect to each other and overlying the lower sieve surface of said passageway.

* * * * *